(12) United States Patent
Shen

(10) Patent No.: US 8,534,518 B2
(45) Date of Patent: Sep. 17, 2013

(54) POSITIONING DEVICE OF VEHICLE RACK

(75) Inventor: Jack C. T. Shen, Taichung (TW)

(73) Assignee: King Roof Industrial Co., Ltd., Taichung (TW)

( * ) Notice: Subject to any disclaimer, the term of this patent is extended or adjusted under 35 U.S.C. 154(b) by 57 days.

(21) Appl. No.: 13/427,687

(22) Filed: Mar. 22, 2012

(65) Prior Publication Data

US 2012/0241486 A1 Sep. 27, 2012

(30) Foreign Application Priority Data

Mar. 25, 2011 (TW) .............................. 100205343 U

(51) Int. Cl.
*B60R 9/058* (2006.01)
*B60R 9/00* (2006.01)

(52) U.S. Cl.
USPC .......................................... 224/329; 224/322

(58) Field of Classification Search
USPC ................. 224/309, 314, 315, 321, 322, 325, 224/329, 330, 331
See application file for complete search history.

(56) References Cited

U.S. PATENT DOCUMENTS

| | | | | |
|---|---|---|---|---|
| 4,496,089 A | * | 1/1985 | Eklund | 224/329 |
| 4,809,943 A | * | 3/1989 | Taschero | 248/503 |
| 4,995,538 A | * | 2/1991 | Marengo | 224/329 |
| 5,588,573 A | * | 12/1996 | Mann | 224/329 |
| 5,931,359 A | * | 8/1999 | Zona | 224/321 |
| 6,641,012 B1 | * | 11/2003 | Lundgren | 224/331 |
| 7,434,713 B2 | * | 10/2008 | Linden | 224/326 |
| 8,087,557 B2 | * | 1/2012 | Larsson et al. | 224/321 |
| 8,393,507 B2 | * | 3/2013 | Aftanas | 224/321 |

* cited by examiner

*Primary Examiner* — Justin Larson

(57) ABSTRACT

A positioning device of vehicle roof rack of the present invention includes a base, a positioning element, a buckle element, and a fixing element. The base forms a plurality of positioning slots and a connecting slot connecting the positioning slots. The positioning element is disposed slidably on the connecting slot and is able to be received in one of the positioning slots alternatively. An end of the buckle element is fixed to the positioning element by the fixing element, and the other end of the buckle element is to be buckled to a perimeter edge of a vehicle. Thereby, the position the buckle element being buckled to the perimeter edge can be adjusted by moving the positioning element. Thus, the positioning device of vehicle roof rack can be employed on vehicles in different sizes.

13 Claims, 6 Drawing Sheets

POSITIONING DEVICE OF VEHICLE RACK

BACKGROUND OF THE INVENTION

1. Field of the Invention

The present invention relates to a rack outside a vehicle, more particularly to a roof rack.

2. Description of the Prior Art

A conventional positioning device of vehicle roof rack is provided to be installed on a roof of a vehicle to position rods, and baggage such as a bicycle is able to be positioned on the rods, as disclosed in patent TW M394933. However, due to the structural limitation, this kind of positioning device can only be employed on a vehicle in a single size. Thus, the positioning device is difficult to be installed on a vehicle in an unsuitable size.

To solve the problem mentioned above, a positioning device which is able to fit to vehicles in different sizes is disclosed in patent TW 435382. However, the positioning device forms a slot to adjusting, and the slot reduces the fixation strength. Thus, undesired sliding or slipping becomes another problem.

The present invention is, therefore, arisen to obviate or at least mitigate the above mentioned disadvantages.

SUMMARY OF THE INVENTION

The main object of the present invention is to provide a positioning device of vehicle roof rack which is able to be employed on vehicles in different sizes.

To achieve the above and other objects, a positioning device of vehicles roof rack of the present invention includes a base, a positioning element, a buckle element, and a fixing element.

The base forms at least a support portion, and the support portion forms an adjusting slot including a connecting slot and at least two positioning slots extending downward. An extending direction of each positioning slot and an extending direction of the connecting slot are not parallel. Each positioning slot connects with the connecting slot. A working plane is defined by the connecting slot and the positioning slots.

The positioning element is detachably disposed on the adjusting slot. More specifically, the positioning element is able to slide along the connecting slot and to be received in one of the positioning slots alternatively. An engaging hole is formed on the positioning element and an extending direction of the engaging hole is parallel to the working plane.

The buckle element has a first end and a second end. An insertion hole is formed at the first end, and a buckle portion is formed at the second end. The buckle portion is provided to be buckled to a perimeter edge of a vehicle. The fixing element inserts through the insertion hole and screws with the engaging hole.

Thereby, the positioning element of vehicle roof rack of the present invention is provided to be installed on a vehicle roof. The buckle element is able to be moved by moving the positioning element to a proper positioning slot. Thus, the position the buckle element being positioned on the vehicle roof can be adjusted. Besides, firmer fixation can be achieved.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
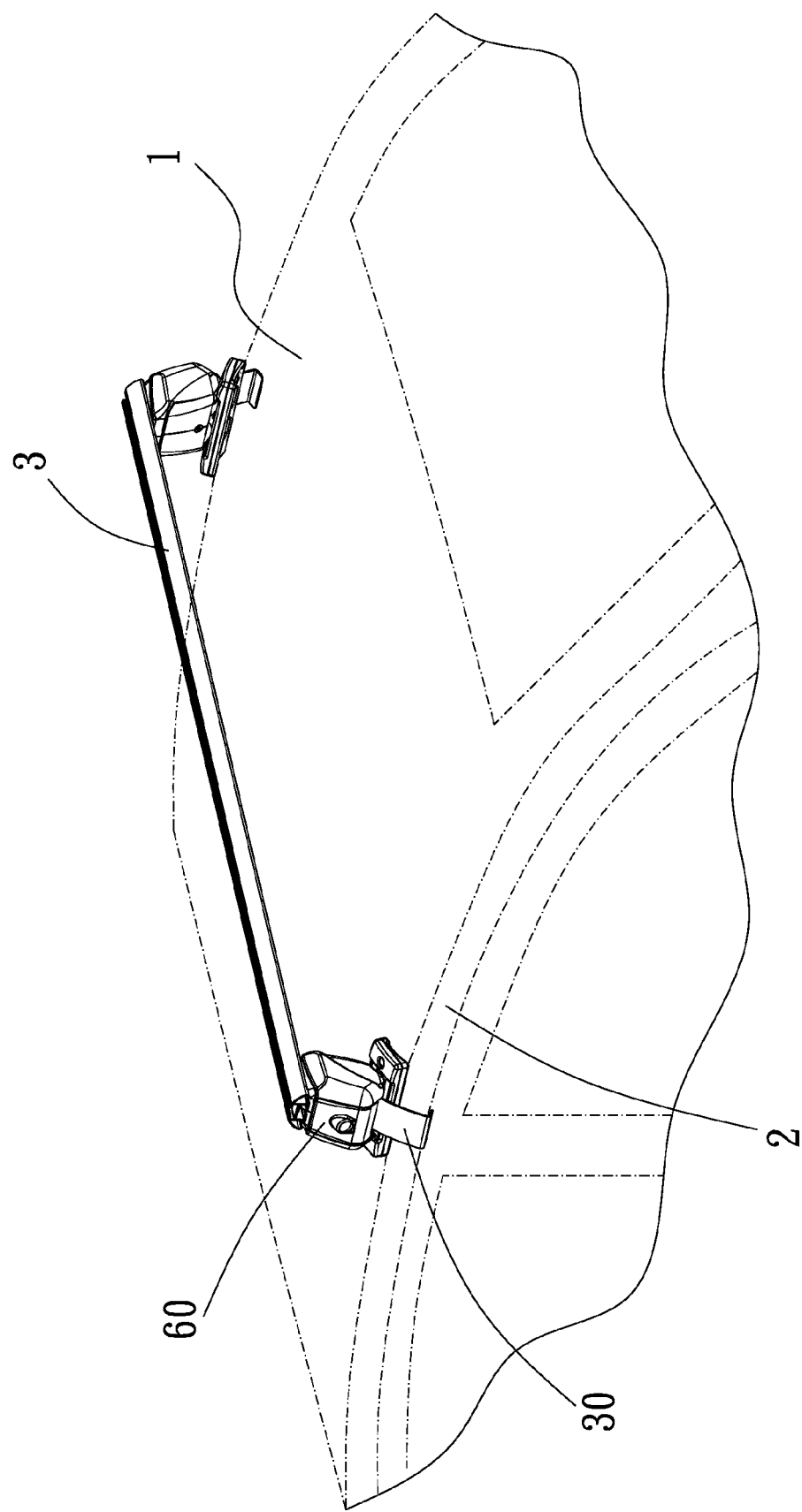
FIG. 1 is an illustration showing a positioning device of vehicle roof rack of the present invention.
Figure 2:
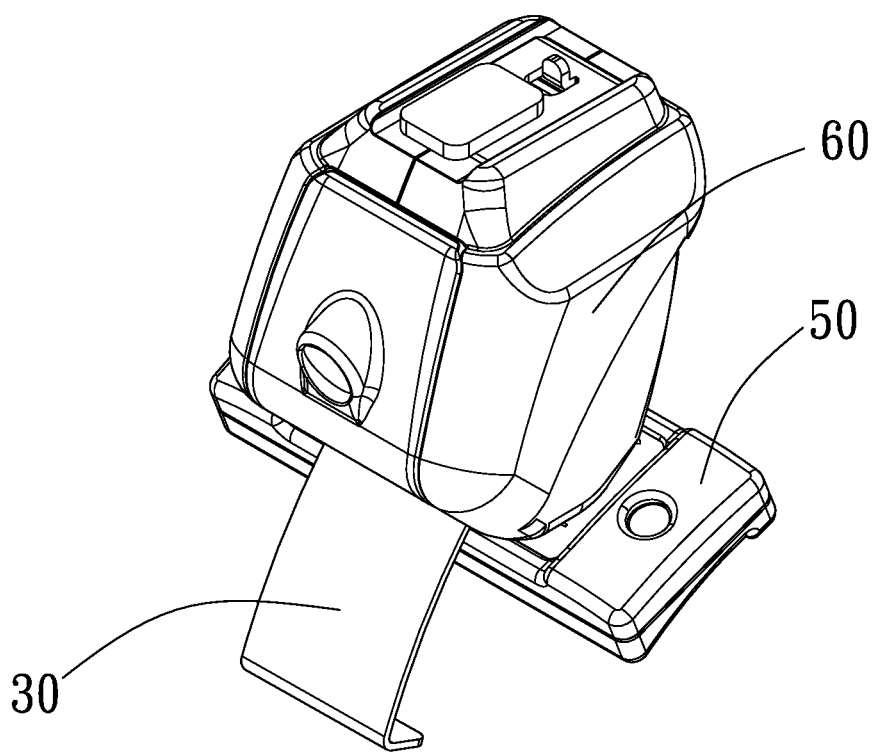
FIG. 2 is a stereogram drawing showing a positioning device of vehicle roof rack of the present invention.
Figure 3:
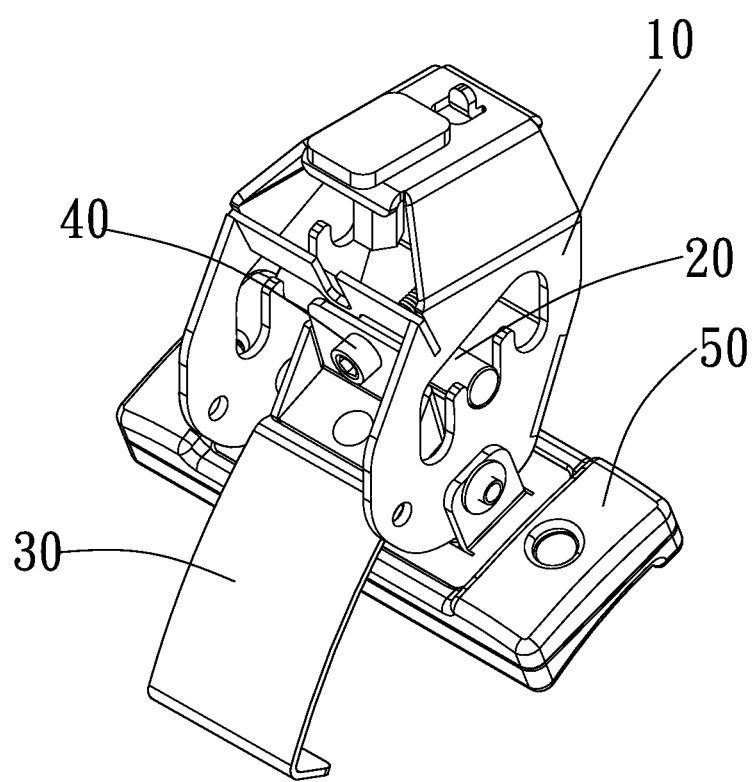
FIG. 3 is a stereogram drawing showing a positioning device of vehicle roof rack without a shell of the present invention.
Figure 4:
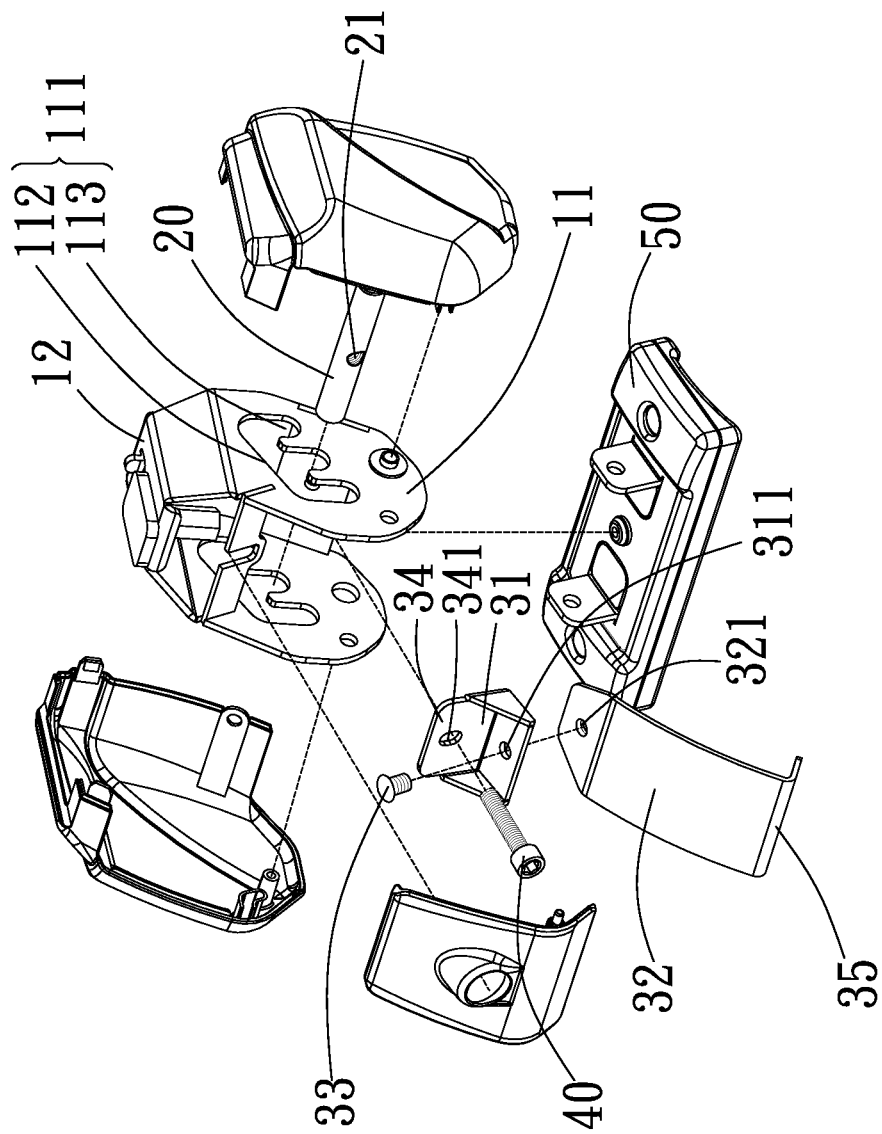
FIG. 4 is a breakdown drawing showing a positioning device of vehicle roof rack of the present invention.

Please refer to FIG. 1 to FIG. 4, the positioning device of vehicle roof rack of the present invention is provided to be installed on a vehicle roof 1 and to be buckled on a perimeter edge 2 of a vehicle, and a cross rod is installed thereon further to position a bicycle or other objects. The positioning device of vehicle roof rack includes a base 10, a positioning element 20, a buckle element 30, and a fixing element 40, and also optionally includes a pad 50 and a shell 60.

The base 10 forms at least a support portion 11. More preferably, the base 10 forms two support portions 11 and an enhancing portion 12. Each support portion 11 forms an adjusting slot 111 including a connecting slot 112 and at least two positioning slots 113 extending downward. An extending direction of each positioning slot 113 is not parallel to an extending direction of the connecting slot 112. More preferably, the extending direction of each positioning slot 113 and the extending direction of the connecting slot 112 are oblique to each other. Each positioning slot 113 connects with the connecting slot 112, and a working plane is defined by the connecting slot 112 and the positioning slots 113. In the major embodiment of the present invention, the support portion 11 is plate-shaped, and the connecting slots 112 and each positioning slots 113 penetrate the support portion 11 in a troughshape. The two support portion 11 are arranged parallely and spacedly. The enhancing portion 12 connects the two support portion 11, and the enhancing portion 12 is provided the cross rod 3 to be installed thereon.

The positioning element 20 is slidably disposed on the adjusting slot 111. More preferably, the positioning element 20 is rod-shaped and is disposed in the positioning slots 113 of the two support portion 11. Thus, the positioning element 20 is able to slide along the connecting slot 112 and to be received in one of the positioning slots 113 alternatively. Besides, the positioning element 20 has two opposite larger terminal ends further to prevent the positioning element 20 from falling from the adjusting slot 111. The positioning element 20 forms threaded engaging hole 21 located between the two support portions 11, and the engaging hole 21 is parallel to the working plane.

The buckle element 30 includes a linking element 31 and an extending element 32, and further includes a threaded element 33. The buckle element 30 has a first end 34 and a second end 35, and the buckle element 30 has a linking element 31 at the first end 34 and an extending element 32 at the second end 35. An insertion hole 341 is formed at the first end 34. The extending element 32 is detachably disposed on the linking element 31. More specifically, a through hole 311 is formed on the linking element 31, and a threaded fixing hole 321 is formed on the extending element 32. The threaded element 33 inserts through the through hole 311 and screws with the fixing hole 321 to fix the extending element 32 and the linking element 31 together. However, it may be practicable that the through hole is formed on the extending element and the fixing hole is formed on the linking element.

Besides, the threaded element 33 and the insertion hole 341 are perpendicular to each other preferably. On the other hand, a free end of the extending element 32 is located on the second end 35. A buckle portion is formed at the second end to be buckled to the perimeter edge 2 of vehicle. In other possible embodiment of the present invention, the linking element 31 and the extending element 32 are formed integrally.

The threaded fixing element 40 inserts through the insertion hole 341 and screws with the engaging hole 21. Thereby, the buckle element 30 detachably connects with the positioning element 20. Also, the fixing element 40 and the threaded element 33 are perpendicular to each other.

The pad 50 is disposed on a bottom of the base 10 pivotally to be installed on the roof of vehicle.

The shell 60 is detachably disposed on the base 10. The shell 60 covers the base 10, the positioning element 20, and the first end 34 of the buckle element. Thus, the shell 60 can used to prevent erosion by sunlight or rain to enhance the durability.

Figure 5:
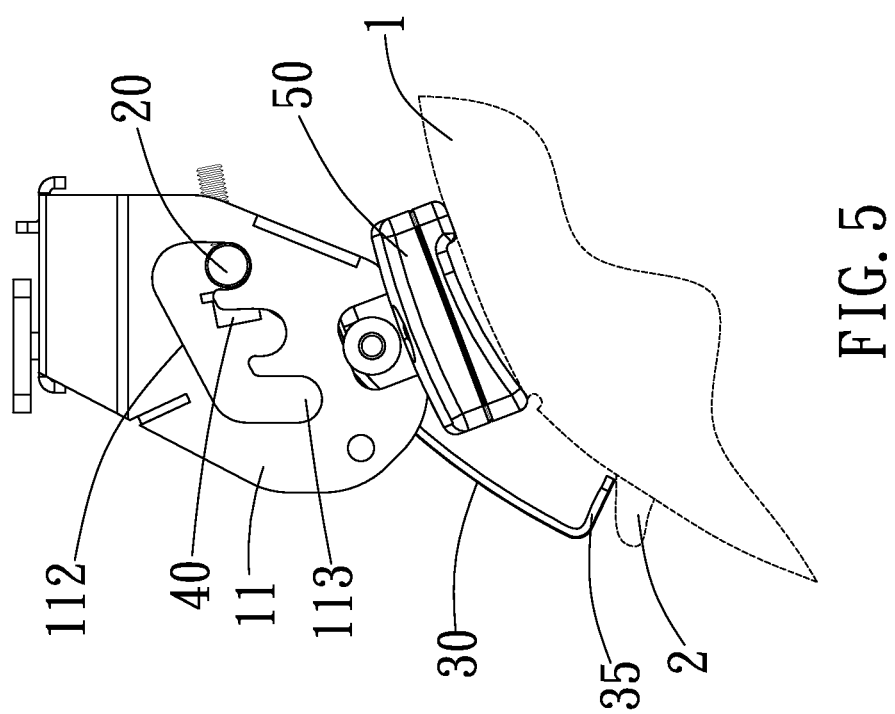
FIGS. 5 to 7 are illustrations showing a positioning device of vehicle roof rack of the present invention.
Figure 6:
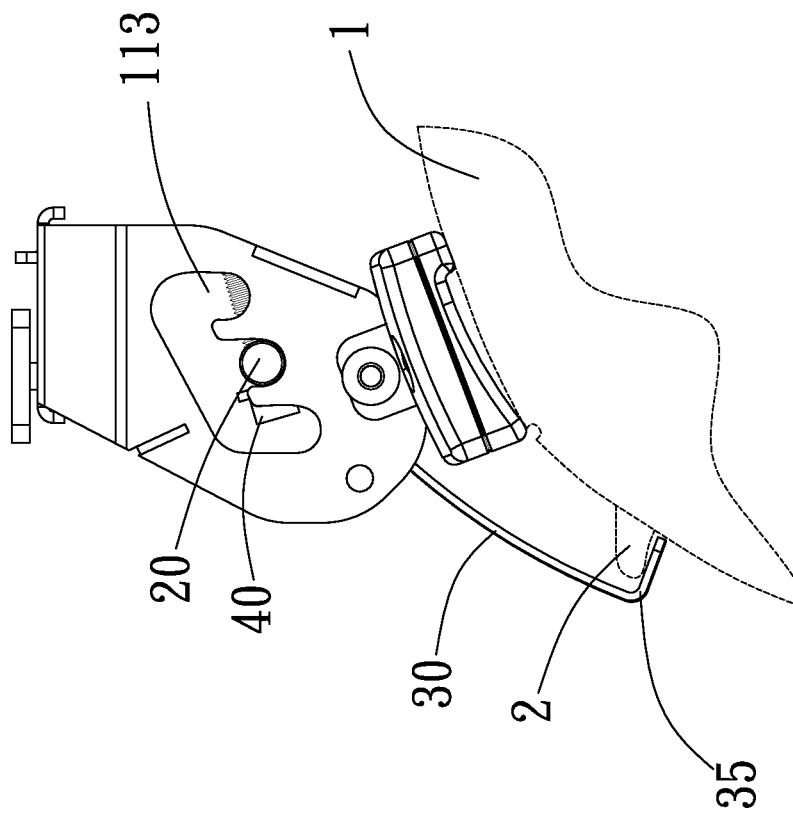
Figure 7:
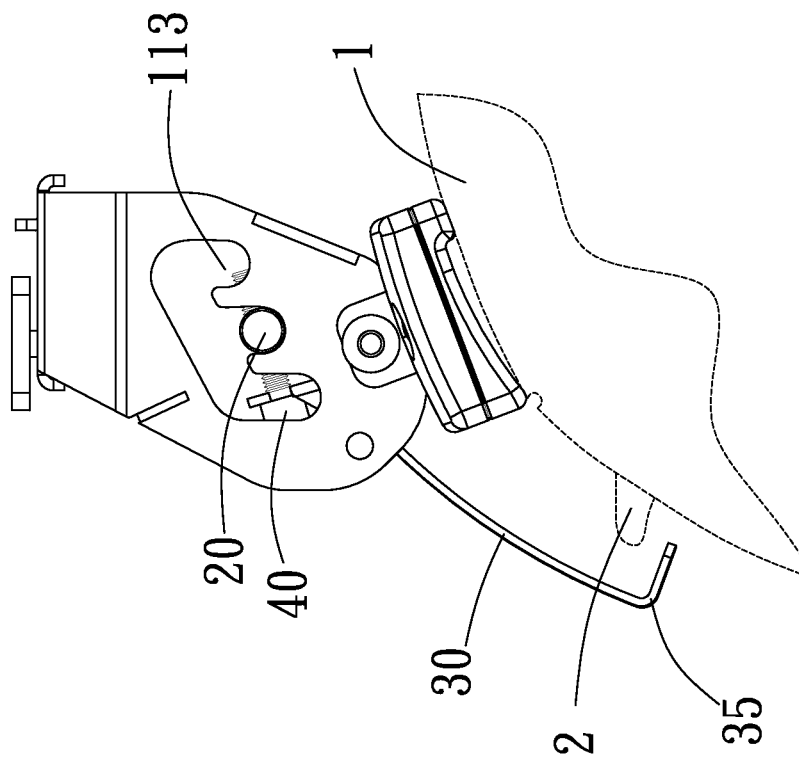

Thereby, the positioning device of vehicle roof rack of the present invention can be employed on roofs 1 of vehicles in different sizes. Please refer to FIG. 5, when the distance between the perimeter edge of vehicle 2 and the roof of vehicle is too far, a user can move the positioning element 20 to a more suitable positioning slot 113, and then the second end 35 of the buckle element 30 is moved toward outside of the perimeter edge 2. In the same time, the fixing element 40 is released, as shown in FIG. 6. After that, the buckle element 30 can be positioned to the perimeter edge 2 by fastening the fixing element 40, as shown in FIG. 7. Thus, the present invention can be employed on vehicles in different sizes. More specifically, the positioning slots 113 extend downward, so the positioning element 20 is prevented from slipping.

In the major embodiment of the present invention, the positioning element is rod-shaped and has a round cross-section. Thus, the positioning element is able not only to slide along the adjusting slot but also to rotate, so the buckle element is pivotable to fit the perimeter edge.

Besides, the extending element can be replaced with one in other size to fit vehicles in different sizes. However, it is also practicable that replacing the buckle element with one in other size when the buckle element is formed integrally.

In conclusion, the positioning device of vehicle roof rack of the present invention is easy to use. Excellent fixation is also provided. More importantly, it fits vehicles in different sizes.

What is claimed is:

1. A positioning device of vehicle roof rack, including:
   a base, the base forms at least a support portion, the support portion forms an adjusting slot including a connecting slot and at least two positioning slots extending downward, an extending direction of each positioning slot being not parallel to an extending direction of the connecting slot, the positioning slots connecting with the connecting slot, a working plane being defined by the connecting slot and the positioning slots;
   a positioning element, being disposed slidably on the adjusting slot, the positioning element being able to slide along the connecting slot and to be received in one of the positioning slots alternatively, an engaging hole being formed on the positioning element, an extending direction of the engaging hole being parallel to the working plane;
   a buckle element, having a first end and a second end, a insertion hole being formed at the first end, a buckle portion being formed at the second end to be buckled to a perimeter edge of a vehicle;
   a fixing element, inserting through the insertion hole and screwing with the engaging hole.

2. The positioning device of vehicle roof rack of claim 1, wherein the extending direction of the connecting slot and the extending direction of each positioning slot are oblique to each other.

3. The positioning device of vehicle roof rack of claim 1, further including a shell, the shell being disposed detachably on the base, the shell covering the base, the positioning element, and the first end of the buckle element.

4. The positioning device of vehicle roof rack of claim 1, wherein the base has two support portions and an enhancing portion, the support portions are arranged parallely and spacedly, the enhancing portion connects the two support portions, the positioning element is rod-shaped and is disposed in the positioning slots of the two support portions, the engaging hole is located between the two support portions.

5. The positioning device of vehicle roof rack of claim 4, wherein the extending direction of the connecting slot and the extending direction of each positioning slot are oblique to each other.

6. The positioning device of vehicle roof rack of claim 1, wherein a pad is disposed on a bottom of the base pivotally to be installed on a roof of the vehicle.

7. The positioning device of vehicle roof rack of claim 6, wherein the extending direction of the connecting slot and the extending direction of each positioning slot are oblique to each other.

8. The positioning device of vehicle roof rack of claim 6, wherein the base has two support portions and an enhancing portion, the support portions are arranged parallely and spacedly, the enhancing portion connects the two support portions, the positioning element is rod-shaped and is disposed in the positioning slots of the two support portions, the engaging hole is located between the two support portions.

9. The positioning device of vehicle roof rack of claim 8, wherein the extending direction of the connecting slot and the extending direction of each positioning slot are oblique to each other.

10. The positioning device of vehicle roof rack of claim 1, wherein the buckle element includes a linking element and an extending element, the linking element is located on the first end, the extending element disposed detachably on the linking element, a free end of the extending element is located on the second end.

11. The positioning device of vehicle roof rack of claim 10, further including a shell, the shell being disposed detachably on the base, the shell covering the base, the positioning element, and the first end of the buckle element.

12. The positioning device of vehicle roof rack of claim 10, wherein the buckle element includes a threaded element, a through hole is formed on one of the linking element or the extending element, a fixing hole is formed on the other one of the linking element or the extending element, the fixing hole is threaded, the threaded element inserts through the through hole and screws with the fixing hole, the threaded element and the fixing element are perpendicular to each other.

13. The positioning device of vehicle roof rack of claim 12, further including a shell, the shell being disposed detachably on the base, the shell covering the base, the positioning element, and the first end of the buckle element.

* * * * *